(12) United States Patent
Valliani et al.

(10) Patent No.: US 11,991,415 B2
(45) Date of Patent: *May 21, 2024

(54) METHODS AND SYSTEMS FOR COUNSELING A USER WITH RESPECT TO SUPERVISED CONTENT

(71) Applicant: Safe Kids LLC, Vienna, VA (US)

(72) Inventors: Abbas Valliani, Vienna, VA (US);
Zohran Valliani, Vienna, VA (US);
Aahil Valliani, Vienna, VA (US)

(73) Assignee: Safe Kids LLC, Vienna, VA (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/736,949

(22) Filed: May 4, 2022

(65) Prior Publication Data

US 2022/0368986 A1 Nov. 17, 2022

Related U.S. Application Data

(63) Continuation of application No. 17/316,715, filed on May 11, 2021, now Pat. No. 11,356,734.

(51) Int. Cl.
*H04N 21/454* (2011.01)
*G06F 21/31* (2013.01)
*G06F 21/51* (2013.01)
*G06N 20/00* (2019.01)

(52) U.S. Cl.
CPC ......... *H04N 21/4542* (2013.01); *G06F 21/31* (2013.01); *G06F 21/51* (2013.01); *G06N 20/00* (2019.01); *G06F 2221/032* (2013.01); *G06F 2221/2141* (2013.01)

(58) Field of Classification Search
CPC .... H04N 21/4542; G06N 20/00; G06F 21/31; G06F 21/51
See application file for complete search history.

(56) References Cited

U.S. PATENT DOCUMENTS

| 8,655,717 | B2 | 2/2014 | Schwarzberg et al. |
| 10,949,774 | B1 * | 3/2021 | Valliani ................. G06V 40/20 |
| 11,309,086 | B1 | 4/2022 | Valliani et al. |
| 11,356,734 | B1 * | 6/2022 | Valliani ............... H04N 21/482 |
| 2005/0081043 | A1 | 4/2005 | Evans et al. |
| 2005/0240959 | A1 | 10/2005 | Kuhn et al. |

(Continued)

OTHER PUBLICATIONS

KR20160077800A (Google translation of KR20160077800A, published Jul. 4, 2016, 12 pages) (Year: 2016).

(Continued)

*Primary Examiner* — Oleg Korsak
(74) *Attorney, Agent, or Firm* — WEW IP Law PLLC

(57) ABSTRACT

The present disclosure is directed to counseling a user with respect to supervised content. In particular, the methods and systems of the present disclosure may: determine, based at least in part on one or more machine learning (ML) models, that one or more interfaces displayed to a user include content of a content type designated by a content supervisor of the user for identification; and, responsive to determining that the interface(s) include content of the content type, generate data representing a graphical user interface (GUI) for presentation to the user, the GUI indicating detection of the content of the content type and comprising educational material counseling the user with respect to the content type.

20 Claims, 10 Drawing Sheets

(56) References Cited

U.S. PATENT DOCUMENTS

| | | |
|---|---|---|
| 2011/0126223 A1 | 5/2011 | Shahraray et al. |
| 2014/0278513 A1 | 9/2014 | Prakash et al. |
| 2014/0372133 A1 | 12/2014 | Austrum et al. |
| 2015/0082335 A1 | 3/2015 | Cobb |
| 2015/0222617 A1 | 8/2015 | Ebersman et al. |
| 2015/0227845 A1 | 8/2015 | Hakkani-Tur et al. |
| 2016/0012194 A1 | 1/2016 | Prakash et al. |
| 2016/0082353 A1 | 3/2016 | Christovale |
| 2016/0300388 A1 | 10/2016 | Stafford et al. |
| 2017/0000422 A1 | 1/2017 | Moturu et al. |
| 2017/0235912 A1 | 8/2017 | Moturu et al. |
| 2018/0349502 A1 | 12/2018 | Maycock |
| 2018/0352301 A1 | 12/2018 | Tofighbakhsh |
| 2019/0282155 A1 | 9/2019 | St Amant et al. |
| 2019/0387191 A1 | 12/2019 | Sharif-Ahmadi et al. |
| 2020/0253527 A1 | 8/2020 | Ellison |

OTHER PUBLICATIONS

Wills (Exchanging Stories: Learning from Each Others Lived Experiences, 2011 4 pages) (Year: 2011).
Duan, Click Patterns: An Empirical Representation of Complex Query Intents (Year: 2012).
MSN 2006 search log dataset documentation, c 2017 (Year: 2017).
International Search Report & Written Opinion of the International Searching Authority for PCT/US2022/016499, dated Mar. 8, 2022.
International Preliminary Report on Patentability for PCT/US2022/016499, dated Nov. 14, 2023.

* cited by examiner

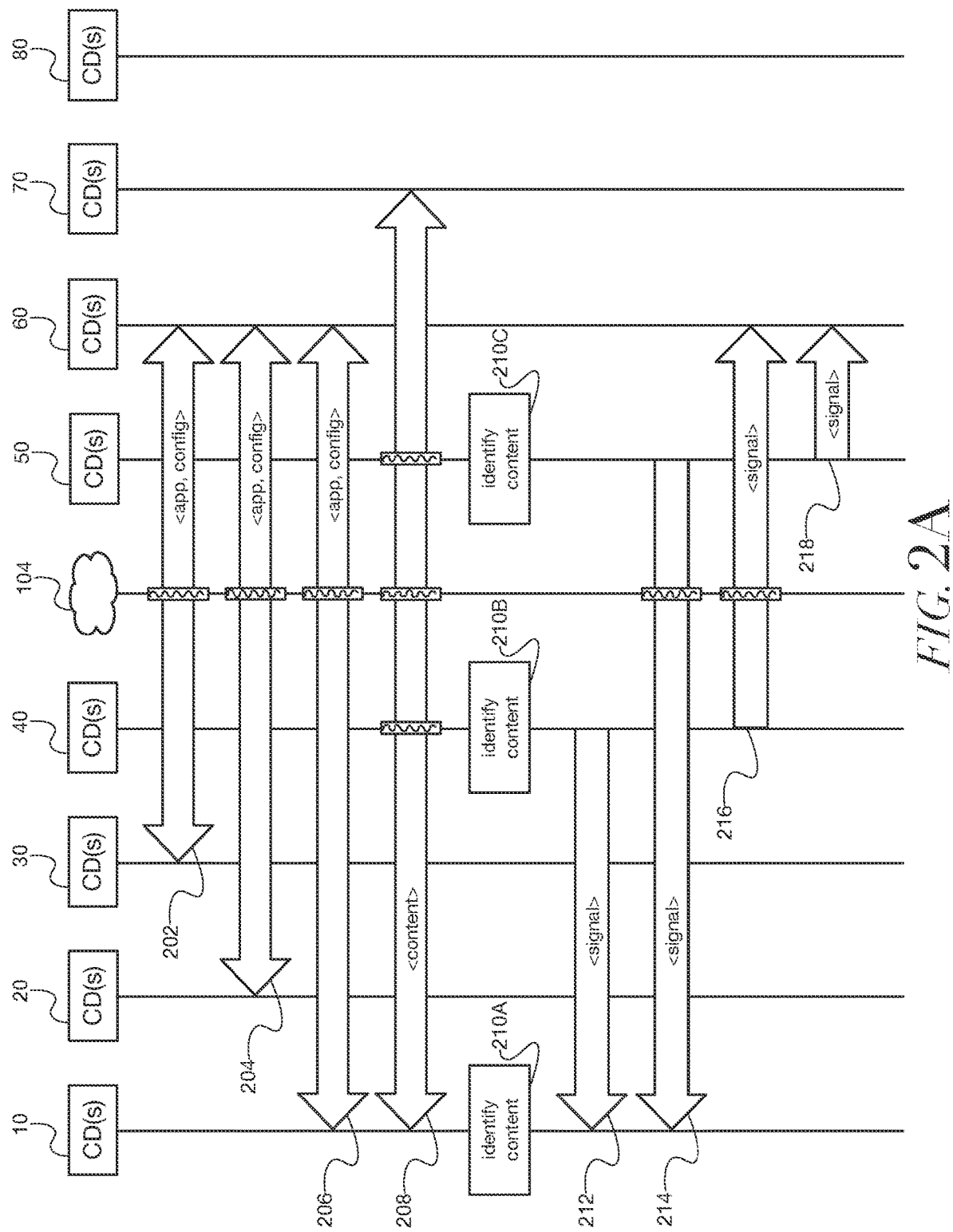

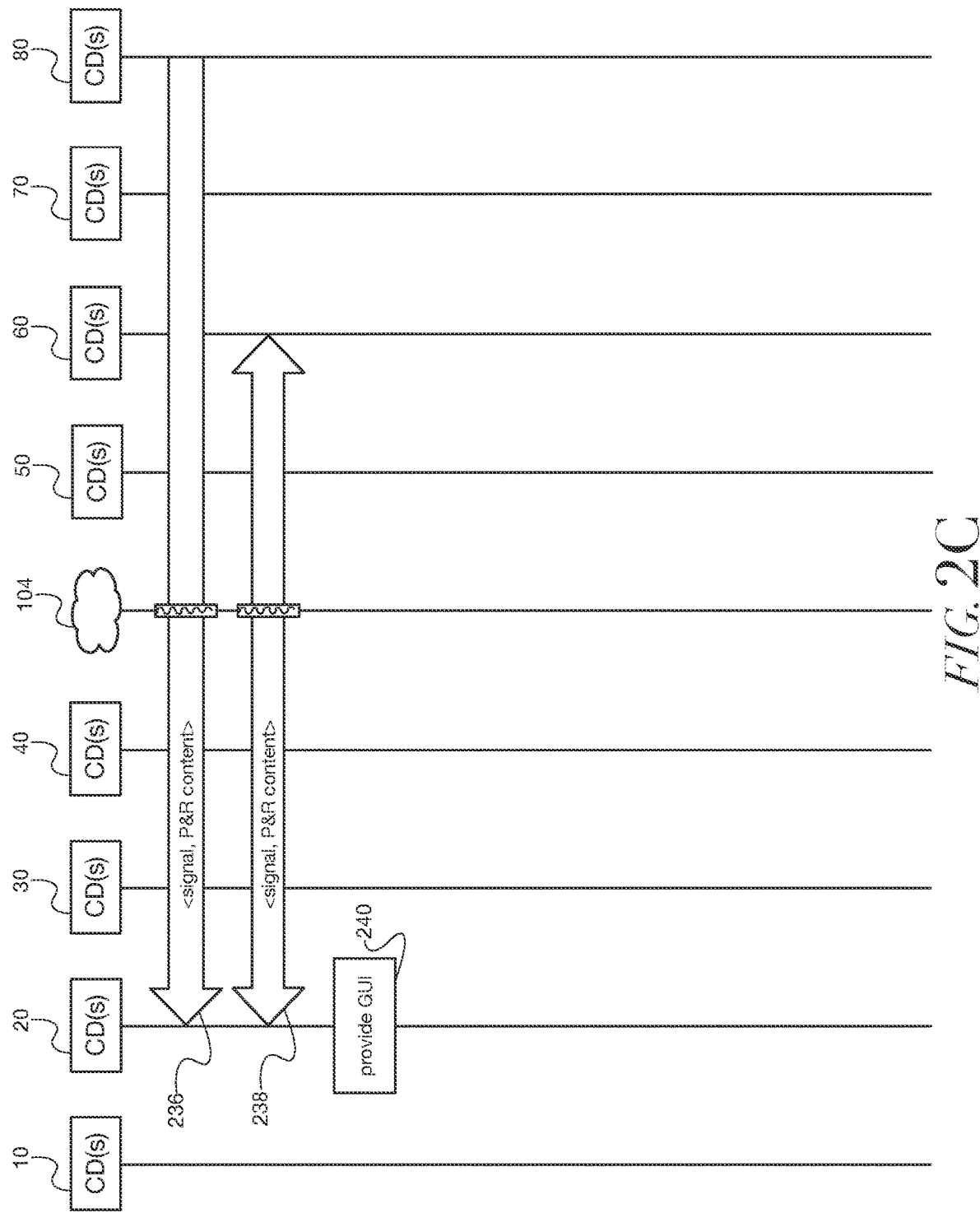

METHODS AND SYSTEMS FOR COUNSELING A USER WITH RESPECT TO SUPERVISED CONTENT

PRIORITY CLAIM

This application is a continuation of, and claims priority to, U.S. patent application Ser. No. 17/316,715, filed May 11, 2021, and entitled "METHODS AND SYSTEMS FOR COUNSELING A USER WITH RESPECT TO SUPERVISED CONTENT," the disclosure of which is incorporated herein by reference in its entirety.

FIELD

The present disclosure relates generally to content supervision. More particularly, the present disclosure relates to methods and systems for counseling a user with respect to supervised content.

BACKGROUND

Computing devices (e.g., desktop computers, laptop computers, tablet computers, set-top devices, smartphones, wearable computing devices, and/or the like) are ubiquitous in modern society. They may support communications between their users, provide their users with entertainment, information about their environments, current events, the world at large, and/or the like. For certain users (e.g., children, employees, and/or the like) there may be a need and/or desire on the part of other individuals or organizations (e.g., parents, employers, and/or the like) to supervise, monitor, and/or the like content provided, displayed, and/or the like to the users by such devices.

SUMMARY

Aspects and advantages of embodiments of the present disclosure will be set forth in part in the following description, or may be learned from the description, or may be learned through practice of the embodiments.

One example aspect of the present disclosure is directed to a method. The method may include determining, by one or more computing devices and based at least in part on one or more machine learning (ML) models, that one or more interfaces displayed to a user include content of a content type designated by a content supervisor of the user for identification. The method may also include, responsive to determining that the interface(s) include content of the content type, generating, by the computing device(s), data representing a graphical user interface (GUI) for presentation to the user, the GUI indicating detection of the content of the content type and comprising educational material counseling the user with respect to the content type.

Another example aspect of the present disclosure is directed to a system. The system may include one or more processors and a memory storing instructions that when executed by the processor(s) cause the system to perform operations. The operations may include determining that one or more interfaces displayed to a user include content of a content type designated by a content supervisor of the user for identification. The operations may also include, responsive to determining that the interface(s) include content of the content type: restricting access by the user to the interface(s); and generating data representing a GUI for presentation to the user, the GUI indicating detection of the content of the content type and comprising educational material counseling the user with respect to the content type.

A further example aspect of the present disclosure is directed to one or more non-transitory computer-readable media. The non-transitory computer-readable media may comprise instructions that when executed by one or more computing devices cause the computing device(s) to perform operations. The operations may include determining that one or more interfaces displayed to a user include content of a content type designated by a content supervisor of the user for identification. The operations may also include, responsive to determining that the interface(s) include content of the content type, generating data representing a GUI for presentation to the user, the GUI indicating detection of the content of the content type and comprising educational material counseling the user with respect to the content type.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in this specification, which makes reference to the appended figures, in which:

FIGS. 2A-C depict an example event sequence according to example embodiments of the present disclosure;

DETAILED DESCRIPTION

With reference now to the Figures, example embodiments of the present disclosure will be discussed in further detail.

Figure 1:
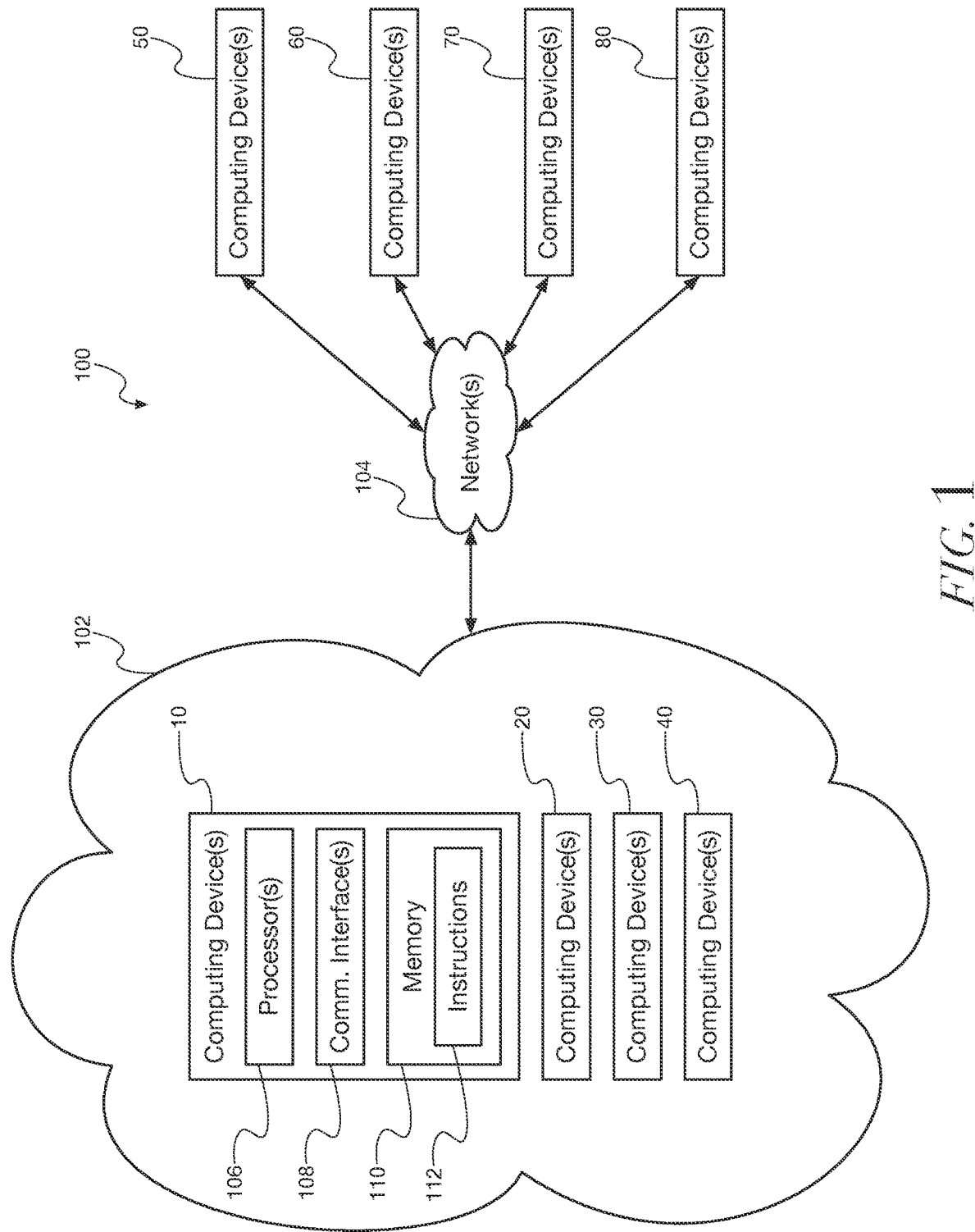
FIG. 1 depicts an example computing environment according to example embodiments of the present disclosure.

FIG. 1 depicts an example computing environment according to example embodiments of the present disclosure.

Referring to FIG. 1, environment 100 may include one or more computing devices (e.g., one or more desktop computers, laptop computers, set-top devices, tablet computers, mobile devices, smartphones, wearable devices, servers, and/or the like). For example, environment 100 may include computing devices 10, 20, 30, 40, 50, 60, 70, and/or 80, any one of which may include one or more associated and/or component computing devices (e.g., a mobile device and an associated wearable device, one or more associated servers, and/or the like). Environment 100 may also include one or more networks, for example, network(s) 102 and/or 104 (e.g., one or more wired networks, wireless networks, and/or the like). Network(s) 102 may interface computing device(s) 10, 20, 30, and/or 40, with one another and/or computing device(s) 50, 60, 70, and/or 80 (e.g., via network(s) 104, and/or the like).

Computing device(s) 10 may include one or more processor(s) 106, one or more communication interfaces 108, and memory 110 (e.g., one or more hardware components for storing executable instructions, data, and/or the like). Communication interface(s) 108 may enable computing device(s) 10 to communicate with computing device(s) 20, 30, 40, 50, 60, 70, and/or 80 (e.g., via network(s) 102, 104, and/or the like). Memory 110 may include (e.g., store, and/or the like) instructions 112. When executed by processor(s) 106, instructions 112 may cause computing device(s) 10 to perform one or more operations, functions, and/or the like described herein. It will be appreciated that computing device(s) 20, 30, 40, 50, 60, 70, and/or 80 may include one or more of the components described above with respect to computing device(s) 10.

Unless explicitly indicated otherwise, the operations, functions, and/or the like described herein may be performed by computing device(s) 10, 20, 30, 40, 50, 60, 70, and/or 80 (e.g., by computing device(s) 10, 20, 30, 40, 50, 60, 70, or 80, by any combination of one or more of computing device(s) 10, 20, 30, 40, 50, 60, 70, and/or 80, and/or the like).

Figure 2B:
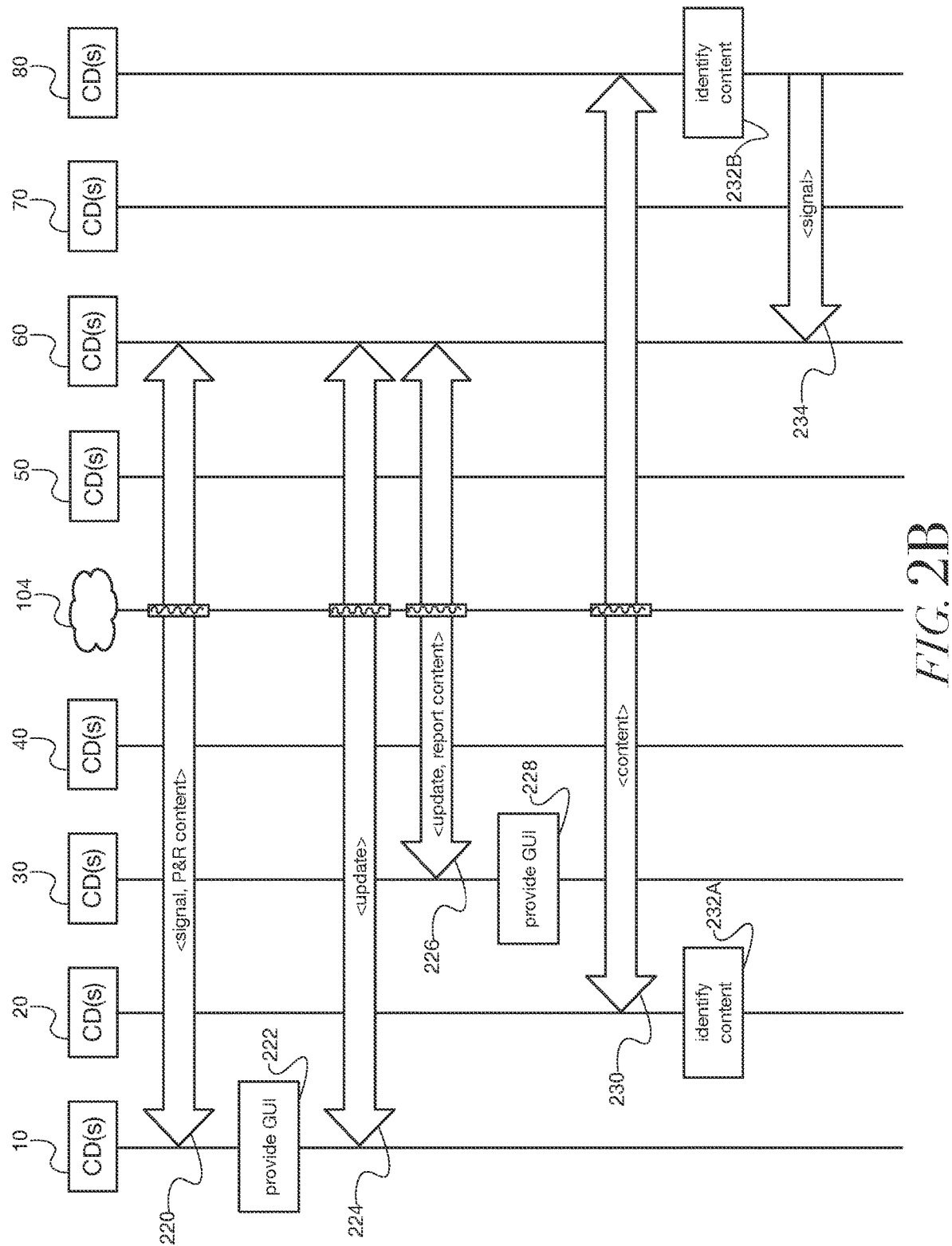

FIGS. 2A-C depict an example event sequence according to example embodiments of the present disclosure.

Referring to FIG. 2A, at (202), computing device(s) 30 (e.g., one or more user devices, and/or the like) and computing device(s) 60 (e.g., one or more servers, and/or the like) may communicate (e.g., via network(s) 104 (as indicated by the pattern-filled box over the line extending downward from network(s) 104), and/or the like) data registering one or more user devices, accounts, and/or the like for content supervision. For example, computing device(s) 10 and/or 20 may be utilized by one or more users (e.g., children, employees, and/or the like) of a user (e.g., parent, employer, and/or the like) utilizing computing device(s) 30, who may register such user device(s) and/or account(s) via a web, application, and/or the like interface provided by computing device(s) 60, and/or the like (e.g., by providing identifying information associated with such user device(s), account(s), and/or the like).

At (204), computing device(s) 20 and 60 may communicate data (e.g., one or more applications, configuration data, machine learning (ML) models, and/or the like), which computing device(s) 20 may receive, store, install, and/or the like. For example, a user (e.g., the parent, employer, and/or the like) may utilize computing device(s) 20 and/or 30 to download, install, and/or the like such data to computing device(s) 20 in order to supervise content displayed by computing device(s) 20, and/or the like.

Similarly, at (206), computing device(s) 10 and 60 may communicate data, which computing device(s) 10 may receive, store, install, and/or the like. For example, a user (e.g., the parent, employer, and/or the like) may utilize computing device(s) 10 and/or 30 to download, install, and/or the like such data to computing device(s) 10 in order to supervise content displayed by computing device(s) 10, and/or the like.

At (208), computing device(s) 10 and 70 (e.g., one or more website servers, content servers, and/or the like) may communicate data (e.g., content data, associated with one or more web browser sessions, application interfaces, and/or the like). Such data may be communicated via network(s) 102, 104, computing device(s) 40 (e.g., one or more local network devices associated with network(s) 102, and/or the like), and computing device(s) 50 (e.g., one or more network devices associated with an internet service provider (ISP) of network(s) 102, 104, and/or the like).

At (210), computing device(s) 10 (e.g., at (210A), and/or the like), 40 (e.g., at (210B), and/or the like), 50 (e.g., at (210C), and/or the like) may determine (e.g., identify, and/or the like) that one or more interfaces displayed to a user of computing device(s) 10 include content of a content type designated by a content supervisor (e.g., the user of computing device(s) 30, and/or the like) of the user for identification. In some embodiments, computing device(s) 10, 40, 50, and/or the like may determine that such interface(s) comprise imagery depicting violence, imagery associated with gambling, sexually explicit imagery, content associated with one or more of bullying, suicidal ideation, psychological concerns, and/or the like.

Figure 3A:
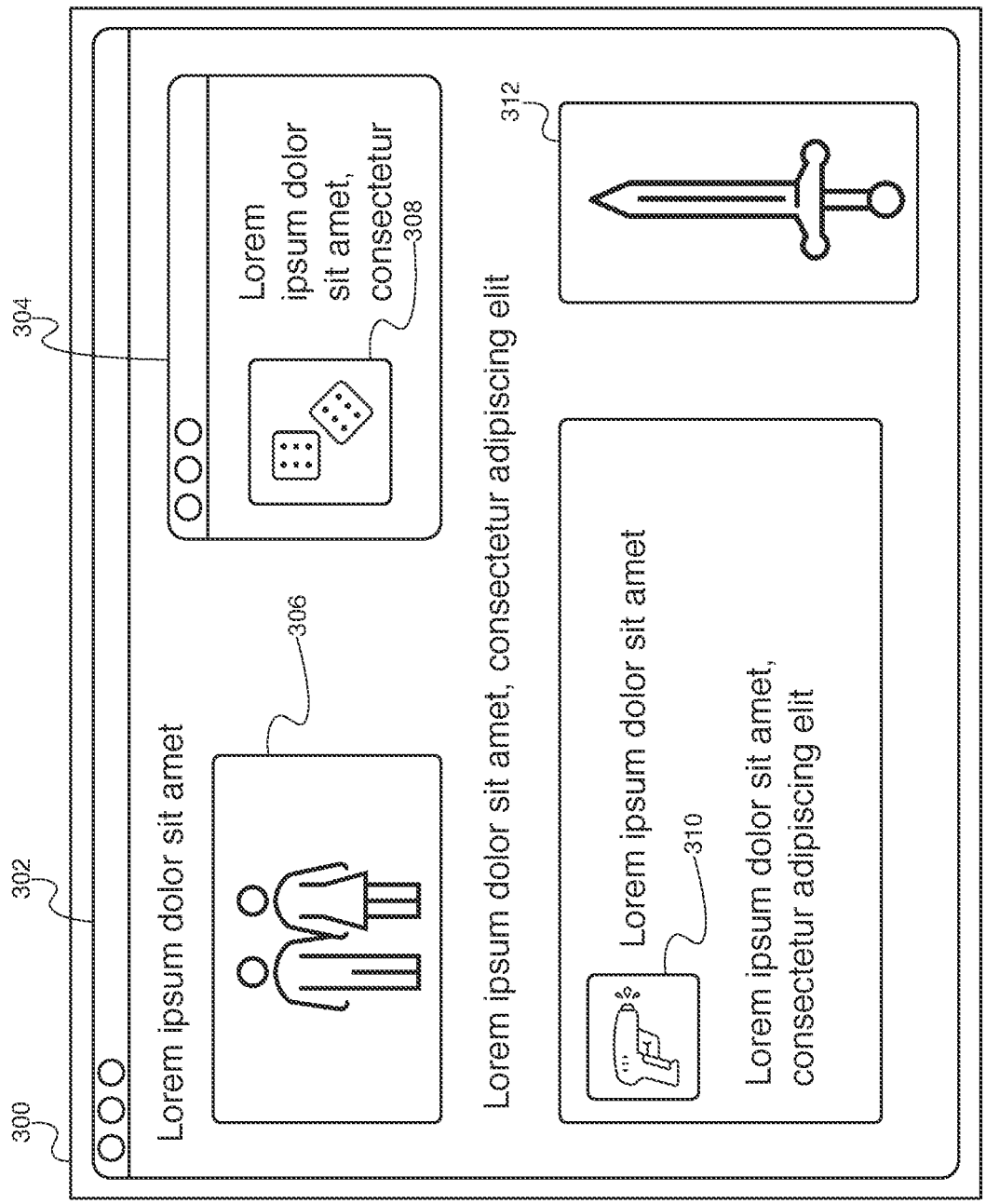
FIGS. 3A-D and 4 depict example interfaces according to example embodiments of the present disclosure.

For example, referring to FIG. 3A, computing device(s) 10 may have displayed image 300. As illustrated, image 300 may depict interfaces 302 and 304 (e.g., associated with the web browser session(s), and/or the like). Interface 302 may include images 306, 310, and 312. Similarly, interface 304 may include image 308. Image 306 may comprise sexually explicit imagery, image 308 may comprise imagery associated with gambling, and images 310 and 312 may comprise imagery depicting violence, and/or the like.

In some embodiments, computing device(s) 10, 40, 50, and/or the like may determine that the interface(s) displayed to the user of computing device(s) 10 (e.g., interface(s) 302, 304, and/or the like) include content of the content type designated by the content supervisor based at least in part on one or more machine learning (ML) models (e.g., one or more neural networks, and/or the like).

In some embodiments, computing device(s) 10, 40, 50, and/or the like may generate data representing one or more images (e.g., image 300, and/or the like) of the interface(s) displayed to the user of computing device(s) 10 (e.g., interface(s) 302, 304, and/or the like), and computing device(s) 10, 40, 50, and/or the like may determine that the interface(s) include the content of the content type based at least in part on the data representing such image(s) of the interface(s). For example, computing device(s) 10, 40, 50, and/or the like may implement one or more aspects of the technology described in U.S. Pat. No. 10,949,774, issued Mar. 16, 2021, and entitled "METHODS AND SYSTEMS FOR SUPERVISING DISPLAYED CONTENT," the disclosure of which is incorporated herein by reference in its entirety.

Additionally or alternatively, computing device(s) 10, 40, 50, and/or the like may receive (e.g., from computing device(s) 10, and/or the like) peripheral input data (e.g., associated with keyboard input, mouse input, voice input, one or more search criteria, and/or the like) and/or network communication data (e.g., uniform resource locator (URL) requests for resolution, and/or the like) associated with activity of the user of computing device(s) 10 and may determine that the interface(s) include the content of the content type based at least in part on such data, and/or the like. In some embodiments, computing device(s) 10, 40, 50, and/or the like may determine that the interface(s) include the content of the content type based at least in part on employing one or more natural language processing (NLP) algorithms with respect to such data, and/or the like.

Returning to FIG. 2A, at (212), computing device(s) 40 may communicate (e.g., signal, and/or the like) data indicating identification of the content, and/or the like to computing device(s) 10, which may receive such data, and/or the like. Similarly, at (214), computing device(s) 50 may communicate (e.g., signal, and/or the like) data indicating identification of the content, and/or the like to computing device(s) 10, which may receive such data, and/or the like;

at (216), computing device(s) 40 may communicate (e.g., signal, and/or the like) data indicating identification of the content, and/or the like to computing device(s) 60, which may receive such data, and/or the like; and, at (218), computing device(s) 50 may communicate (e.g., signal, and/or the like) data indicating identification of the content, and/or the like to computing device(s) 60, which may receive such data, and/or the like.

Referring to FIG. 2B, at (220), computing device(s) 10 and 60 may communicate (e.g., signal, and/or the like) data indicating identification of the content, and/or the like. Additionally or alternatively, computing device(s) 10 and 60 may communicate data comprising educational material counseling the user of computing device(s) 10 with the respect to the identified content type (e.g., "P&R" or "pause and reflect" content, and/or the like).

At (222), responsive to determining that the interface(s) (e.g., interface(s) 302, 304, and/or the like) include content of the content type, computing device(s) 10 may generate (e.g., based at least in part on the data communicated at (220), and/or the like) data representing a graphical user interface (GUI) for presentation (e.g., display, and/or the like) to the user of computing device(s) 10, and/or the like. Such a GUI may indicate identification, detection, and/or the like of the content of the content type. Additionally or alternatively, such a GUI may comprise educational material counseling the user of computing device(s) 10 with respect to the identified content type, and/or the like. For example, the GUI may include content counseling the user about the impact of viewing such content on their emotional health, wellbeing, productivity, and/or the like. Responsive to a determination that the interface(s) include content indicating a need for potential immediate intervention (e.g., suicidal ideation, self-harm thoughts, and/or the like), such a GUI may urge the user to defer action (e.g., via personal testimony from other individuals about their similar experiences, and/or the like).

Figure 3B:
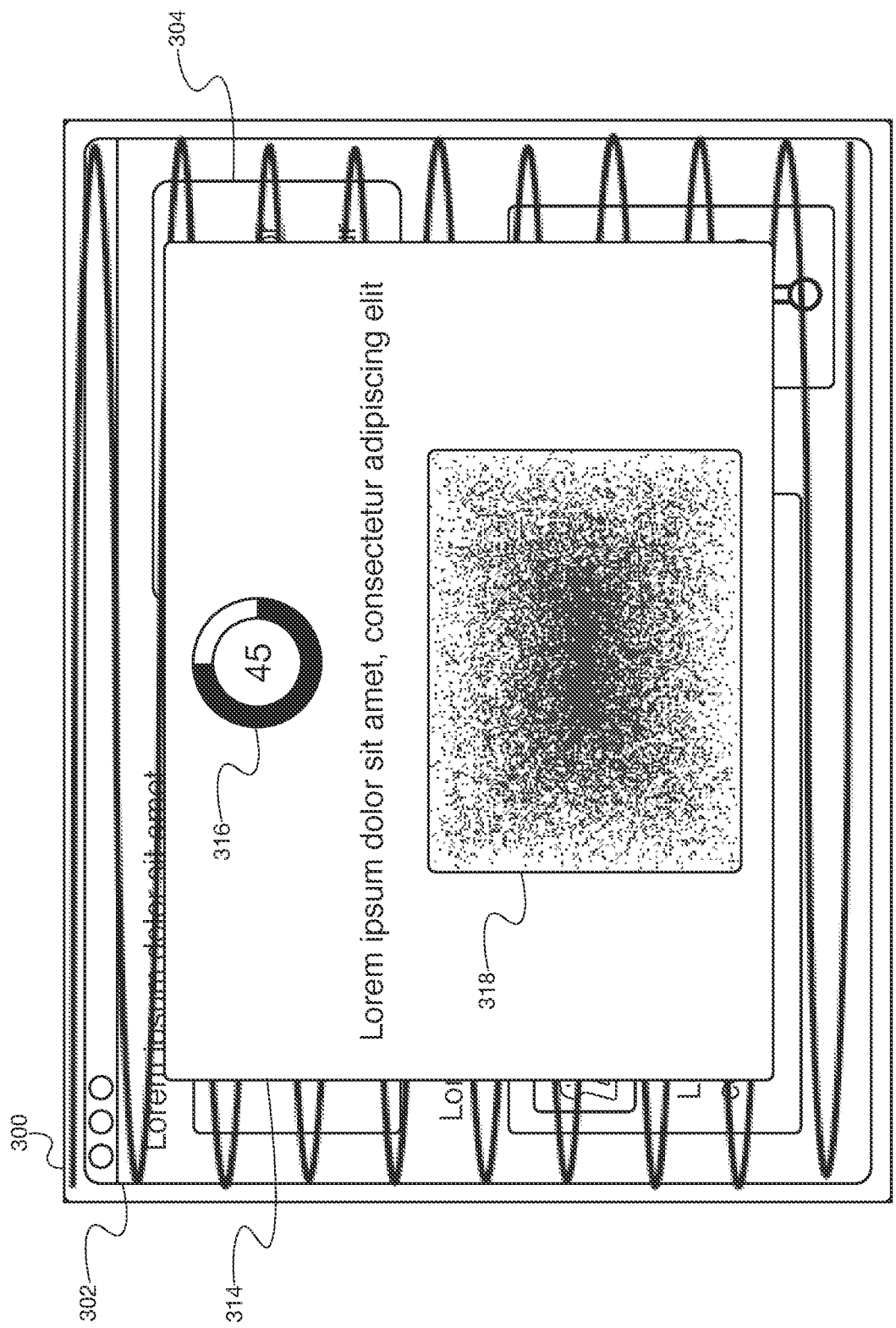

For example, referring to FIG. 3B, computing device(s) 10 may generate data representing interface 314, and/or the like. As illustrated, responsive to determining that the interface(s) (e.g., interface(s) 302, 304, and/or the like) include content of the content type, computing device(s) 10 may restrict (e.g., via interface 314, and/or the like) access by the user of computing device(s) 10 to the interface(s) determined to include the content of the content type (e.g., interface(s) 302, 304, and/or the like).

In some embodiments, computing device(s) 10 may determine a time period for restricting such access by the user of computing device(s) 10 to the interface(s) determined to include the content of the content type (e.g., interface(s) 302, 304, and/or the like). In some of such embodiments, the GUI may include one or more elements (e.g., element(s) 316, and/or the like) indicating the time period, an elapsed portion of the time period, a remaining portion of the time period, and/or the like. In some embodiments, computing device(s) 10 may determine (e.g., dynamically, and/or the like) the time period based at least in part on the content type, a determined level of severity of the content of the content type, a determined number of times one or more interfaces displayed to the user of computing device(s) 10 included content of the content type, and/or the like.

In some embodiments, the educational content counseling the user of computing device(s) 10 with respect to the content type may comprise a video (e.g., of an individual discussing their personal experience having viewed content of the content type, recovering from particular types of content addiction, anxiety, depression, violent urges, suicidal or self-harm thoughts, and/or the like). In some of such embodiments, the GUI may include one or more elements (e.g., element(s) 318, and/or the like) associated with such video, and/or the like.

Figure 3C:
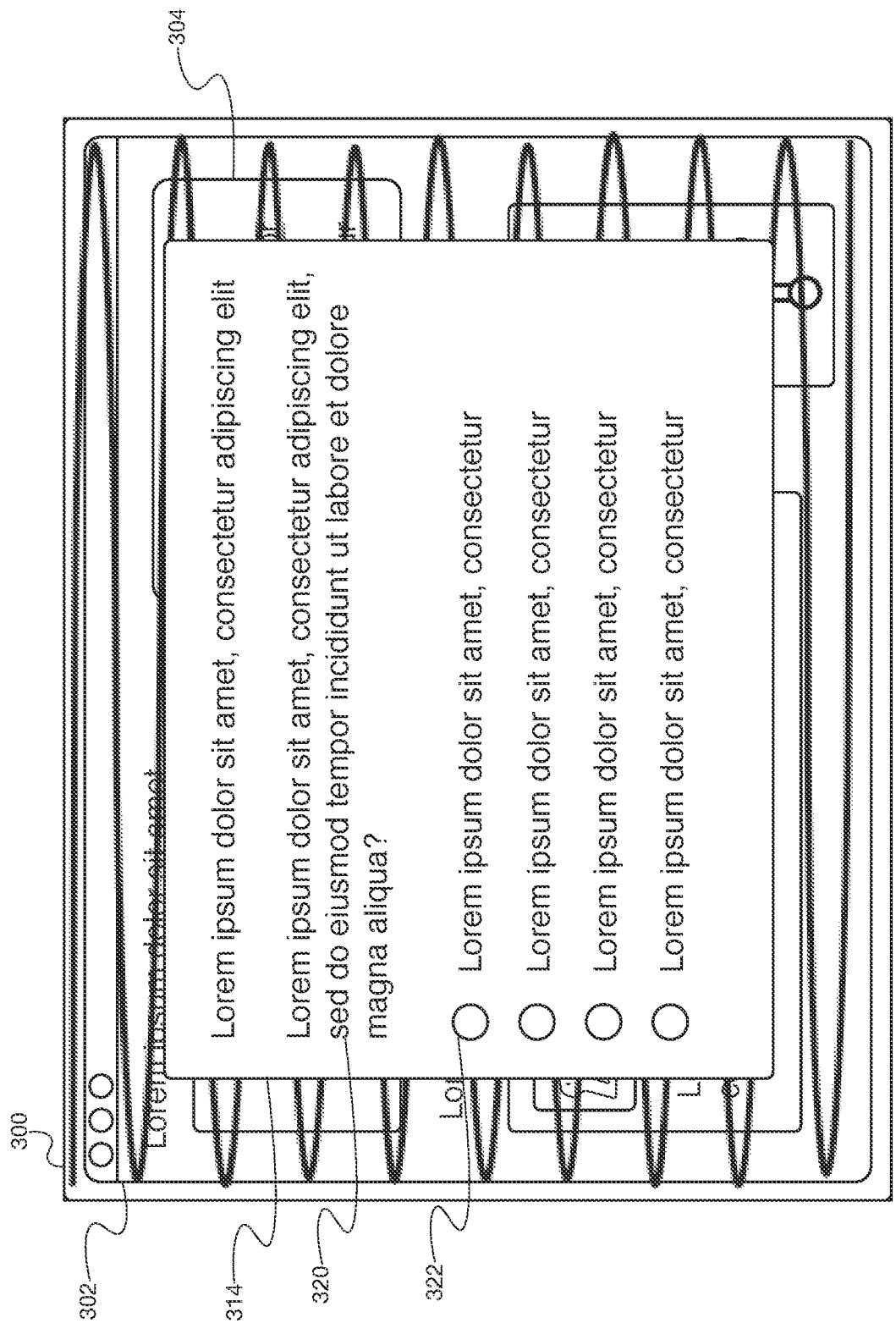

Additionally or alternatively, the GUI may comprise one or more interactive elements associated with the educational content counseling the user of computing device(s) 10 with respect to the content of the content type, and/or the like. For example, referring to FIG. 3C, the GUI may provide the user of computing device(s) 10 with a quiz on one or more aspects of the educational content (e.g., to reinforce desired behavior, assets their mood, emotional health, mental-state, and/or the like) and may include one or more associated elements, e.g., element(s) 320 (e.g., posing a question to the user of computing device(s) 10 regarding the educational content, and/or the like) and/or element(s) 322 (e.g., presenting one or more possible responsive answers for selection by the user of computing device(s) 10, and/or the like).

Figure 3D:
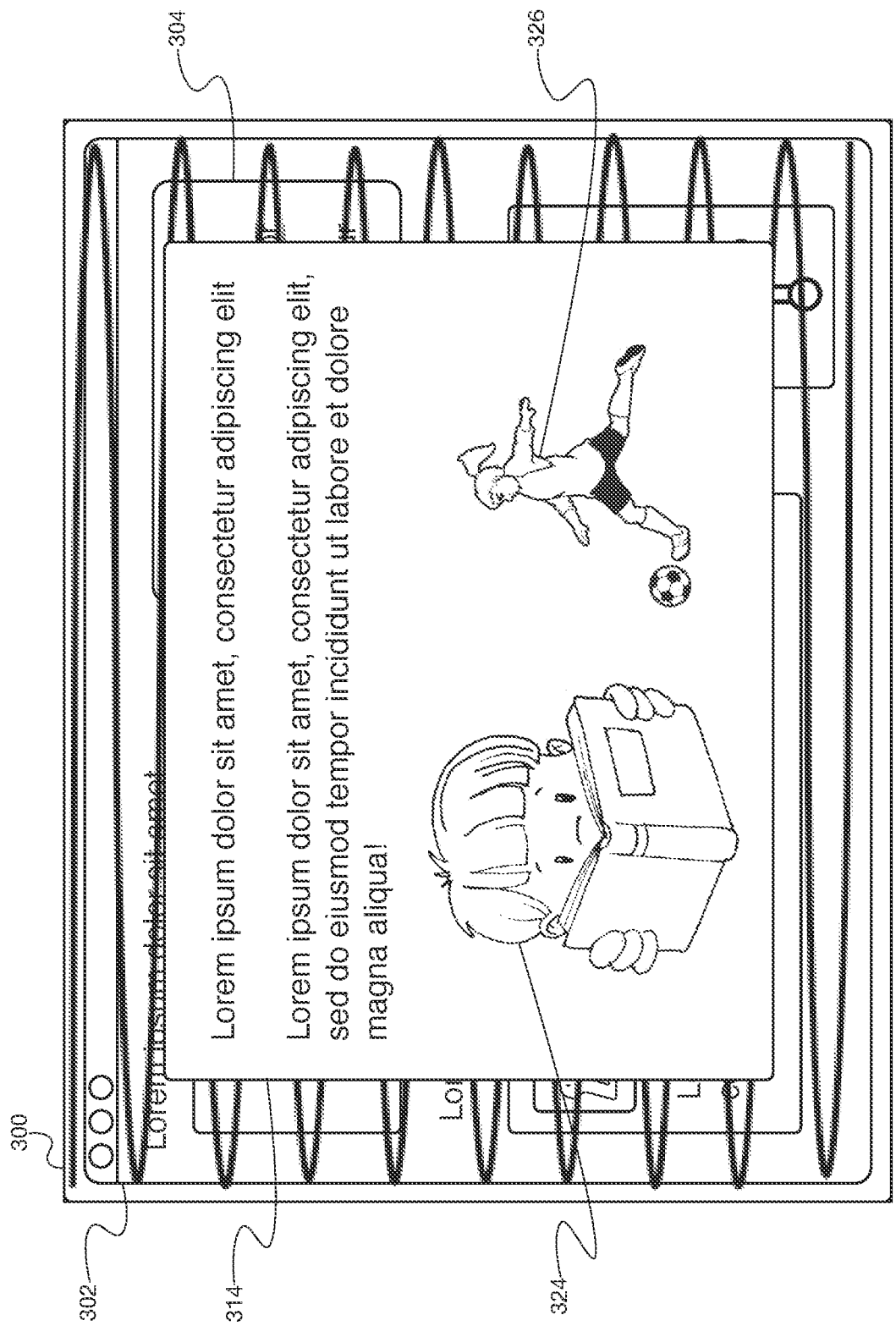

In some embodiments, the GUI may include one or more elements instructing the user of computing device(s) 10 to engage in a different computer activity, a non-computer activity, and/or the like for a determined period of time. For example, referring to FIG. 3D, the GUI may include element(s) 324 (e.g., instructing the user to engage in a different indoor, computer activity, and/or the like) and/or element(s) 326 (e.g., instructing the user to engage in an outdoor, non-computer activity, and/or the like).

Returning to FIG. 2B, at (224), computing device(s) 10 and 60 may communicate data (e.g., an update based at least in part on display of, user interaction with, and/or the like interface 314, and/or the like).

At (226), computing device(s) 30 and 60 may communicate data (e.g., an update, report, and/or the like based at least in part on display of, user interaction with, and/or the like interface 314, and/or the like).

At (228), computing device(s) 30 may generate (e.g., based at least in part on the data communicated at (226), and/or the like) data representing a GUI for presentation to the content supervisor. Such a GUI may indicate, for example, detection of the content (e.g., image(s) 306, 308, 310, 312, and/or the like) of the content type (e.g., determined to be included in interface(s) 302, 304, and/or the like). Responsive to a determination that the interface(s) include content indicating a need for potential immediate intervention on the part of the content supervisor (e.g., suicidal ideation, self-harm thoughts, and/or the like), such a GUI may be presented to the content supervisor as soon as possible, technologically feasible, and/or the like.

Figure 4:
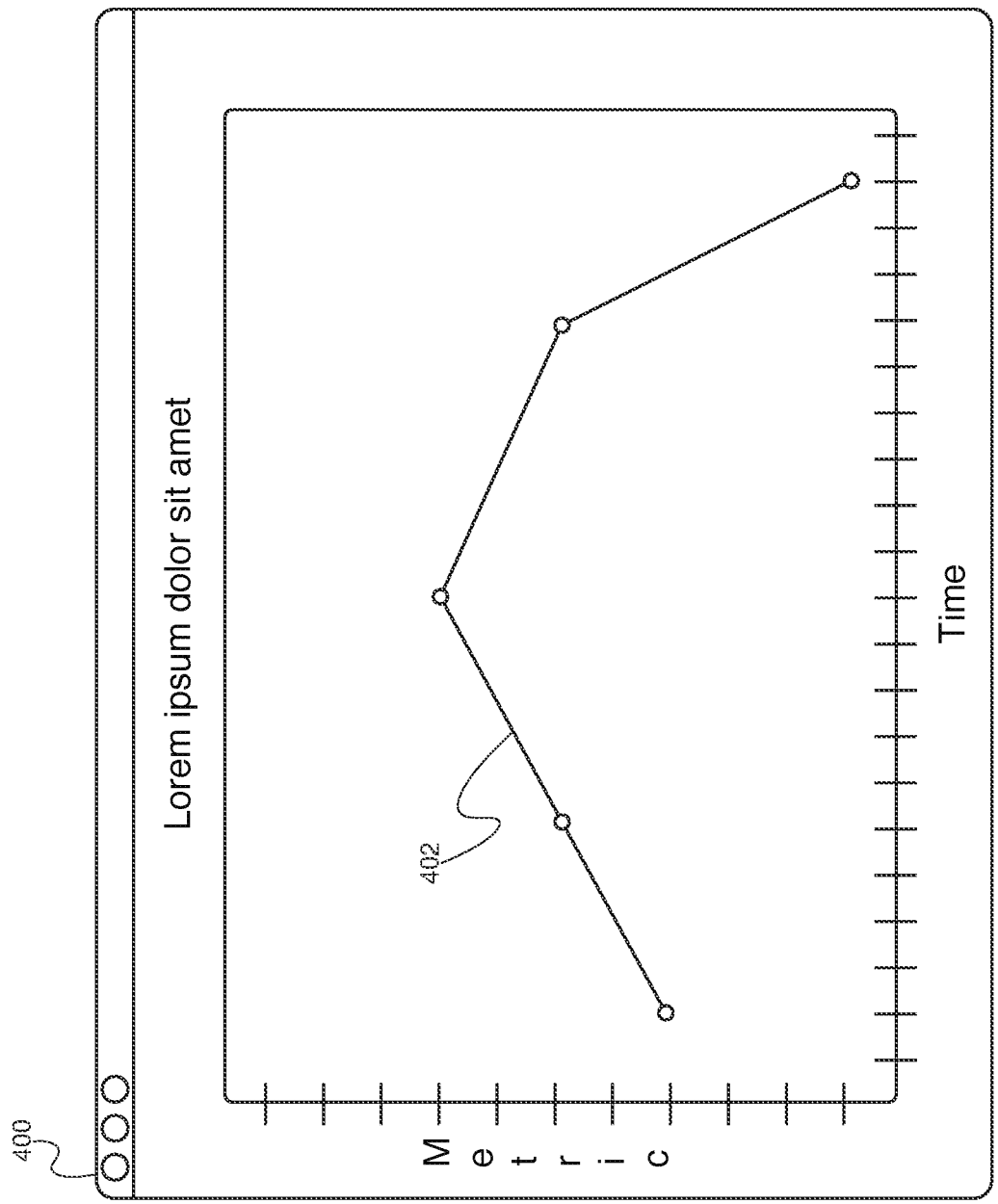

In some embodiments, the GUI for presentation to the content supervisor may comprise one or more elements graphically depicting activity of the user with respect to at least the content type (e.g., based at least in part on a metric of mood, emotion, intent, mental health, productivity, age of the user, and/or the like) over a period of time including at least the time when the interface(s) determined to include the content of the content type were displayed (e.g., by computing device(s) 10, and/or the like). For example, referring to FIG. 4, computing device(s) 30 may generate data representing interface 400, which may include element(s) 402 depicting such a graph, and/or the like.

Returning to FIG. 2B, at (230), computing device(s) 20 and 80 (e.g., one or more website servers, content servers, and/or the like) may communicate data (e.g., content data, associated with one or more web browser sessions, application interfaces, social media, and/or the like).

At (232), computing device(s) 20 (e.g., at (232A), and/or the like) and/or 80 (e.g., at (232B), and/or the like) may determine (e.g., identify, and/or the like) that one or more interfaces displayed to a user of computing device(s) 20 include content of a content type designated by a content supervisor (e.g., the user of computing device(s) 30, and/or the like) of the user for identification.

At (234), computing device(s) 80 may communicate (e.g., signal, and/or the like) data indicating identification of the content, and/or the like to computing device(s) 60, which may receive such data, and/or the like.

Referring to FIG. 2C, at (236), computing device(s) 80 may communicate (e.g., signal, and/or the like) data indicating identification of the content, comprising educational material counseling the user of computing device(s) 20 with the respect to the identified content type, and/or the like to computing device(s) 20, which may receive such data, and/or the like. It will be appreciated that in certain contexts (e.g., social media, and/or the like) such a counseling approach may present one or more advantages over other alternative approaches (e.g., suspending a user's account, and/or the like).

At (238), computing device(s) 20 and 60 may communicate (e.g., signal, and/or the like) data indicating identification of the content, comprising educational material counseling the user of computing device(s) 20 with the respect to the identified content type, and/or the like.

At (240), responsive to determining that the interface(s) (e.g., interface(s) 302, 304, and/or the like) include content of the content type, computing device(s) 20 may generate (e.g., based at least in part on the data communicated at (236), (238), and/or the like) data representing a GUI for presentation (e.g., display, and/or the like) to the user of computing device(s) 20, and/or the like. For example, referring to FIG. 3B, computing device(s) 20 may generate data representing interface 314, and/or the like.

Figure 5:
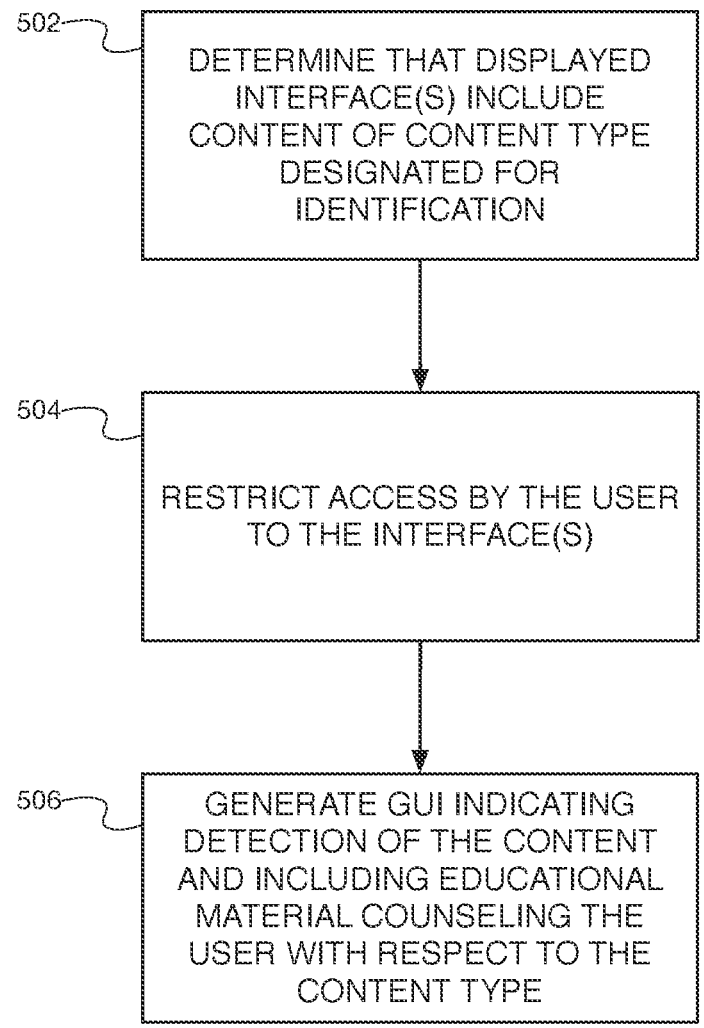
FIG. 5 depicts an example method according to example embodiments of the present disclosure.

FIG. 5 depicts an example method according to example embodiments of the present disclosure.

Referring to FIG. 5, at (502), one or more computing devices may determine that one or more interfaces displayed to a user include content of a content type designated by a content supervisor of the user for identification. For example, computing device(s) 10, 20, 40, 50, 80, and/or the like may determine that one or more interfaces (e.g., interface(s) 302, 304, and/or the like) displayed to a user of computing device(s) 10, 20, and/or the like include content of a content type designated (e.g., via computing device(s) 30, and/or the like) by a content supervisor of the user for identification, and/or the like.

At (504), responsive to determining that the interface(s) include content of the content type, the computing device(s) may restrict access by the user to the interface(s). For example, responsive to determining that interface(s) 302, 304, and/or the like include content of the content type(s) designated by the user of computing device(s) 30, and/or the like, computing device(s) 10, 20, and/or the like may restrict (e.g., via interface 314, and/or the like) access to interface(s) 302, 304, and/or the like.

At (506), responsive to determining that the interface(s) include content of the content type, the computing device(s) may generate data representing a GUI for presentation to the user. The GUI may indicate detection of the content of the content type, comprise educational material counseling the user with respect to the content type, and/or the like. For example, responsive to determining that interface(s) 302, 304, and/or the like include content of a content type designated by the user of computing device(s) 30, and/or the like, computing device(s) 10, 20, and/or the like may generate interface 314 for presentation to the user of computing device(s) 10, 20, and/or the like.

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein may be implemented using a single device or component and/or multiple devices or components working in combination. Databases and/or applications may be implemented on a single system and/or distributed across multiple systems. Distributed components may operate sequentially and/or in parallel.

Various connections between elements are discussed in the above description. These connections are general and, unless specified otherwise, may be direct and/or indirect, wired and/or wireless. In this respect, the specification is not intended to be limiting.

The depicted and/or described steps are merely illustrative and may be omitted, combined, and/or performed in an order other than that depicted and/or described; the numbering of depicted steps is merely for ease of reference and does not imply any particular ordering is necessary or preferred.

The functions and/or steps described herein may be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors of a computer and/or other data-processing device. The computer-executable instructions may be stored on a computer-readable medium such as a hard disk, optical disk, removable storage media, solid-state memory, read-only memory (ROM), random-access memory (RAM), or the like. As will be appreciated, the functionality of such instructions may be combined and/or distributed as desired. In addition, the functionality may be embodied in whole or in part in firmware and/or hardware equivalents, such as integrated circuits, application-specific integrated circuits (ASICs), field-programmable gate arrays (FPGAs), or the like. Particular data structures may be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein may be embodied as a method, system, apparatus, and/or one or more computer-readable media storing computer-executable instructions. Accordingly, aspects may take the form of an entirely hardware embodiment, an entirely software embodiment, an entirely firmware embodiment, and/or an embodiment combining software, hardware, and/or firmware aspects in any combination.

As described herein, the various methods and acts may be operative across one or more computing devices and/or networks. The functionality may be distributed in any manner or may be located in a single computing device (e.g., server, client computer, user device, or the like).

Aspects of the disclosure have been described in terms of illustrative embodiments thereof. Numerous other embodiments, modifications, and/or variations within the scope and spirit of the appended claims may occur to persons of ordinary skill in the art from a review of this disclosure. For example, one of ordinary skill in the art may appreciate that the steps depicted and/or described may be performed in other than the recited order and/or that one or more illustrated steps may be optional and/or combined. Any and all features in the following claims may be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment may be used with another embodiment to yield a still further embodiment. Thus, it is intended that the present disclosure cover such alterations, variations, and/or equivalents.

What is claimed is:

1. A method comprising:
   determining, by one or more computing devices and based at least in part on one or more machine learning (ML) models, that one or more interfaces displayed to a user include content of a content type designated by a content supervisor of the user for identification; and
   responsive to determining that the one or more interfaces include the content of the content type, generating, by the one or more computing devices, data representing a graphical user interface (GUI) for presentation to the user, the GUI comprising educational material counseling the user with respect to the content type.

2. The method of claim 1, comprising responsive to determining that the one or more interfaces include the content of the content type, restricting, by the one or more computing devices, access by the user to the one or more interfaces.

3. The method of claim 2, comprising determining, by the one or more computing devices, a time period for restricting the access by the user to the one or more interfaces.

4. The method of claim 3, wherein the GUI comprises one or more elements indicating at least one of the time period, an elapsed portion of the time period, or a remaining portion of the time period.

5. The method of claim 3, wherein determining the time period for restricting the access by the user comprises determining the time period based at least in part on one or more of the content type, a determined level of severity of the content of the content type, or a determined number of times one or more interfaces displayed to the user included content of the content type.

6. The method of claim 1, wherein the educational content counseling the user with respect to the content type comprises a video of an individual discussing their personal experience having viewed content of the content type.

7. The method of claim 1, wherein the GUI comprises one or more interactive elements comprising a quiz on one or more aspects of the educational content counseling the user with respect to the content type.

8. The method of claim 1, wherein the GUI comprises one or more elements instructing the user to engage in a different computer activity for a determined period of time.

9. The method of claim 1, wherein the GUI comprises one or more elements instructing the user to engage in a non-computer activity for a determined period of time.

10. The method of claim 1, comprising, responsive to determining that the one or more interfaces include the content of the content type, generating, by the one or more computing devices, data representing a GUI for presentation to the content supervisor, the GUI for presentation to the content supervisor indicating detection of the content of the content type.

11. The method of claim 10, wherein the GUI for presentation to the content supervisor comprises one or more elements graphically depicting activity of the user with respect to at least the content type over a period of time including at least a time when the one or more interfaces determined to include the content of the content type were displayed.

12. The method of claim 1, wherein determining that the one or more interfaces displayed to the user include the content of the content type comprises determining that the one or more interfaces comprise at least one of imagery depicting violence, imagery associated with gambling, sexually explicit imagery, or content associated with one or more of bullying, suicidal ideation, or psychological concerns.

13. The method of claim 1, wherein:
   the method comprises generating, by the one or more computing devices, data representing one or more images of the one or more interfaces displayed to the user; and
   determining that the one or more interfaces displayed to the user include the content of the content type comprises determining that the one or more interfaces include the content of the content type based at least in part on the data representing the one or more images of the one or more interfaces.

14. The method of claim 1, wherein:
   the method comprises receiving, by the one or more computing devices, data representing peripheral input data associated with activity of the user; and
   determining that the one or more interfaces displayed to the user include the content of the content type comprises determining that the one or more interfaces include the content of the content type based at least in part on the data representing the peripheral input data.

15. The method of claim 1, wherein:
   the method comprises receiving, by the one or more computing devices, data representing network communication data associated with activity of the user; and
   determining that the one or more interfaces displayed to the user include the content of the content type comprises determining that the one or more interfaces include the content of the content type based at least in part on the data representing the network communication data.

16. The method of claim 1, wherein:
   determining that the one or more interfaces include the content of the content type comprises determining, by the one or more computing devices and based at least in part on data communicated by one or more servers that served the content to a user device that displayed the one or more interfaces, that the one or more interfaces include the content of the content type; and
   generating the data representing the GUI comprises generating, by the one or more computing devices and based at least in part on data communicated by the one or more servers that served the content to the user device, the data representing the GUI.

17. A system comprising:
one or more processors; and
a memory storing instructions that when executed by the one or more processors cause the system to perform operations comprising:
    determining that one or more interfaces displayed to a user include content of a content type designated by a content supervisor of the user for identification; and
    responsive to determining that the one or more interfaces include the content of the content type:
        restricting access by the user to the one or more interfaces; and
        generating data representing a graphical user interface (GUI) for presentation to the user, the GUI indicating detection of the content of the content type.

18. The system of claim 17, wherein determining that the one or more interfaces include the content of the content type comprises determining that the one or more interfaces include the content of the content type based at least in part on one or more machine learning (ML) models.

19. One or more non-transitory computer-readable media comprising instructions that when executed by one or more computing devices cause the one or more computing devices to perform operations comprising:
    determining that one or more interfaces displayed to a user include content of a content type designated by a content supervisor of the user for identification; and
    responsive to determining that the one or more interfaces include the content of the content type, generating data representing a graphical user interface (GUI) for presentation to the user, the GUI indicating detection of the content of the content type.

20. The one or more non-transitory computer-readable media of claim 19, wherein determining that the one or more interfaces include the content of the content type comprises determining that the one or more interfaces include the content of the content type based at least in part on one or more machine learning (ML) models.

* * * * *